Dec. 28, 1948.     G. L. H. HERONDELLE     2,457,150
GYROSCOPE SYSTEM

Filed April 1, 1943

INVENTOR
GUY L. H. HERONDELLE
BY
ATTORNEY

INVENTOR.
GUY L. H. HERONDELLE
ATTORNEY.

Patented Dec. 28, 1948

2,457,150

UNITED STATES PATENT OFFICE 2,457,150

GYROSCOPE SYSTEM

Guy L. H. Herondelle, Lyon, France, assignor to International Standard Electric Corporation, New York, N. Y., a corporation of Delaware Application April 1, 1943, Serial No. 481,507
In France October 30, 1941

Section 1, Public Law 690, August 8, 1946
Patent expires October 30, 1961

8 Claims. (Cl. 74—5)

The present invention relates to gyroscopic systems and particularly has for its object to provide damping and reference apparatus adapted particularly for artificial horizon work and gyroscopic steering.

According to certain features of the invention, damping apparatus, artificial horizon apparatus, gyroscopic steering apparatus, or other apparatus utilizing the properties of a gyroscope, is constructed to employ a ballast liquid which is caused to rotate in the interior of a bulb, spherical chamber or of any other appropriate hollow body of revolution whose axis of generation passes through the center of gravity of the system to be stabilized.

According to another feature of the invention, the rotation of the ballast liquid is maintained by means of the shaft of the gyroscope which is extended into and partially immersed in the liquid, this shaft carrying at its end, a wheel or paddle of any appropriate form for entraining the liquid.

According to another feature of the invention, the form of the upper part of the bulb or chamber which holds the ballast liquid is so arranged that it increases the reaction of the liquid on its walls when by any chance the inclination of the system to be stabilized accidentally passes a certain limit.

These and other objects and features of the invention will be understood from the following detailed description of an embodiment illustrative thereof, in connection with the accompanying drawings, in which.

Figure 6:
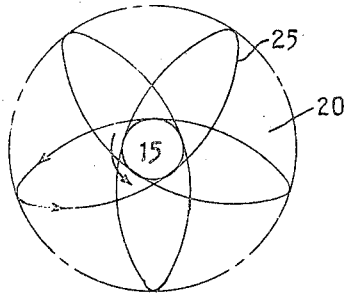
Figure 5:
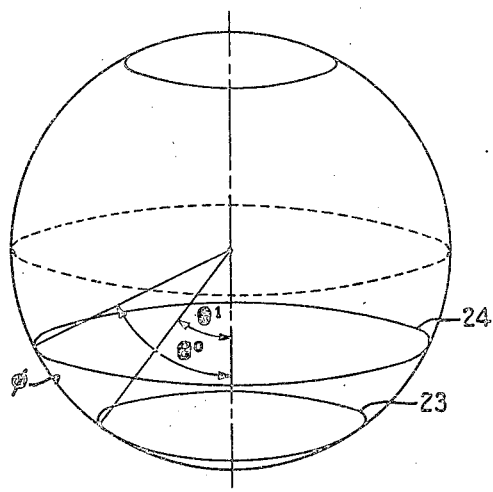
Figure 7:
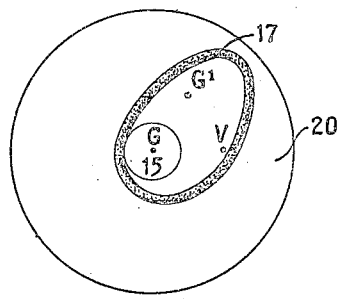

Fig. 5, in top plan view, helps to explain the approximate spheric position of the damping liquid;

Fig. 6, in top plan view, shows the path of the damping liquid while rotating about the axis of the gyroscope under the influence of the gyratory movement; and Fig. 7 shows the distortion of the path of the damping liquid produced by a deviation of the gyroscope from its vertical equilibrium position.

Figure 1:
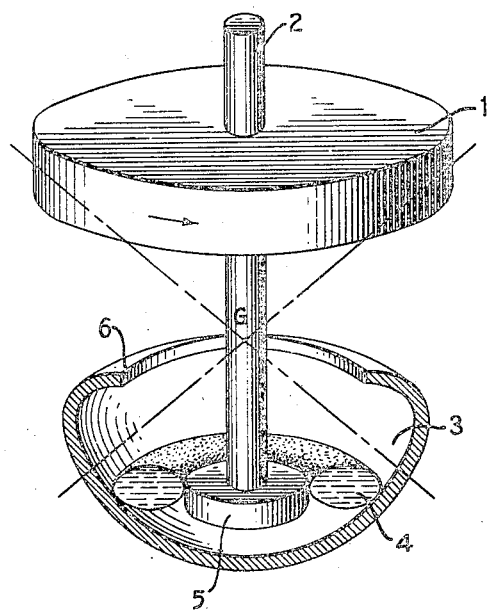
Figs. 1 and 2 are schematic perspective views, partly in section, showing gyroscopic damping and reference apparatus in two different operating positions, respectively, in accordance with the present invention.

In Fig. 1, the gyroscopic system is indicated in the form of a rotating cylinder 1 on the shaft 2.

The lower end of shaft 2 is extended to project into the chamber consisting of the hollow body of revolution 3 around the gyroscope shaft 2 and secured to the case of the gyroscope.

In the interior of this chamber 3 is placed a liquid ballast 4 of mercury for example which is set into rotation by a wheel 5 fixed to the end of shaft 2 of the gyroscope and taking on the form of a ring of elliptical shape under the influence of the centrifugal force, and the acceleration due to the curvature of the walls of chamber 3.

The axes of this elliptical ring are displaced at a certain speed in the direction of rotation of gyroscope 1 and if the shaft 2 of the gyroscope and therefore the axis of the mass of mercury revolved coincides with the vertical axis at this point of the earth's surface, then the sum of the reactions of the ballast liquid 4 on the assemblage 1 is neutralized because of symmetry.

Figure 2:
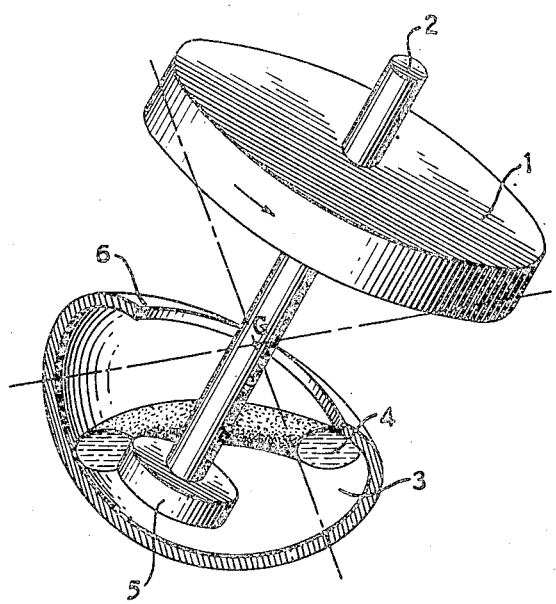

If on the contrary the axis of the chamber of revolution 3 does not coincide with the vertical line through the gravitational vertical, Fig. 2, the symmetry of the liquid ring is broken and its center of gravity has a tendency to be displaced towards a lower point, but the entrainment of the liquid by the wheel 5 displaces this center of gravity in advance of the lowest point. A precession is induced in a spiral direction and the resultant of the reaction is such that this precession is damped after the axis of the chamber coincides again with the vertical line through that point.

The chamber 3 could be vertical and the damping set can be increased by giving the upper part of the chamber 3 an appropriate form such as indicated at 6 in Figs. 1 and 2 for the purpose of increasing the reaction of the ring of liquid 4 when the inclination of the stabilizing system accidentally passes a certain limit.

Figure 3:
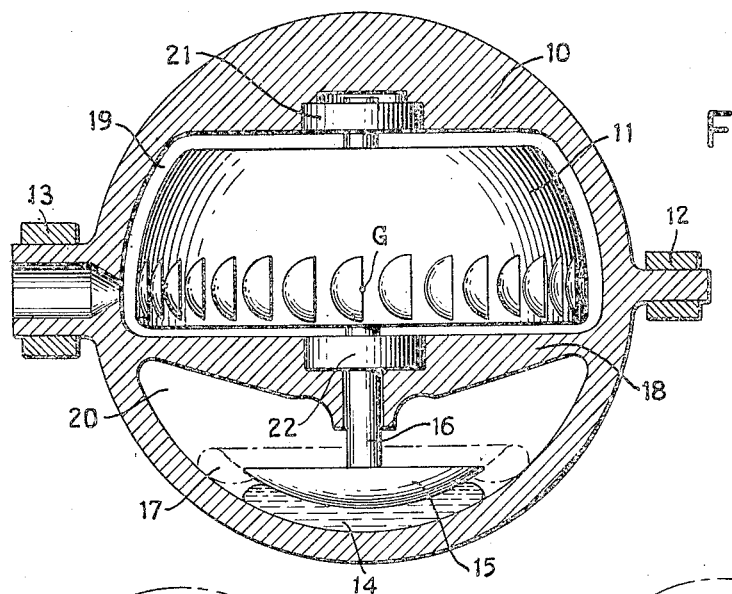
Fig. 3 is a vertical section of a gyroscopic system embodying the principles described in connection with Figs. 1 and 2.

An example of an embodiment of such a damping or reference apparatus is shown in vertical section in Fig. 3. In this figure a spherical casing 10 is mounted on a universal suspension, not shown, by means of two roller bearings 12 and 13. The interior of this casing 10 is divided into two chambers 19 and 20 by the horizontal partition 18. In the upper chamber 19 is mounted the gyroscope 11 on the two bearings 21 and 22. The gyroscope 11 can be driven pneumatically or electrically as desired.

Lower chamber 20 contains the reference system obtained by the mercury bath 14 in which is immersed the wheel 15 rotated by the shaft 16 of the gyroscope 11 which is operated in a vertical or nearly vertical position.

Wheel 15 is shown in the form of a vertical cap concentric with the inner wall of chamber 20 but it will be understood that the wheels could be of any other suitable form.

The system when constructed as described is balanced in such fashion that its center of gravity G may be located at the point of intersection of the axis of the universal suspension and the center of the spherical surface on which the mercury 14 is displaced. When at rest for example the liquid 14 is without effect on the balance of the assembly, the mercury rotates in a sphere whose center coincides with the center of gravity of the system within the angular limit compatible with the mechanical construction.

Figure 4:
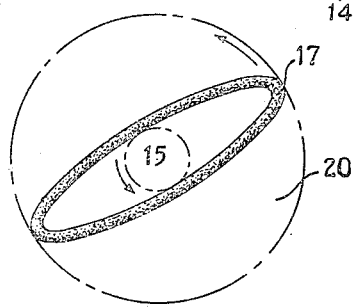
Fig. 4, in top plan view, shows the approximate shape of the path of the damping liquid.

If we suppose the system to be in a balanced position, that is to say with the axis of gyroscope 11 coinciding with the shaft in a vertical position at that point, the rotation of the wheel 15 entrains the mercury 14 in such manner as to make the mercury take the form of a liquid ring 17 as a result of the centrifugal force acting thereon. Because of the friction of this ring of mercury on the wall of chamber 20 the cross section of the ring is not maintained in circular form but it takes on an elliptical shape as represented in the schematic plan view in Fig. 4 under such conditions of operation. Each point of this liquid is determined by the laws governing the motion of a pendulum moving in the path of a conic section, that is to say that a point on the ring 17 moves in such a direction that is to substantially describe an ellipse.

In Fig. 5 $\theta_0$ and $\theta_1$ designate the elevation which the parallel minimum and maximum ordinates 23 and 24 respectively make with the displacement of the liquid ring and in each case where $\theta_0$ is less than $\pi/2$, the azimuth $\phi$ described by a point on the ring between the ordinate $\theta_0$ and the ordinate $\theta_1$ may be expressed in well known manner by the expression: $\phi = \pi/2(1 + \frac{3}{8}\theta_0\theta_1)$ where the angle is small. It will be seen that the arc $\phi$ described is less than $\pi/2$ of a quantity which is of the order of the square of the amplitude. Consequently the trajectory of the center of gravity of the ring which is displaced in the direction of entrainment of the liquid this direction being precisely opposite to the precession force of the gyroscope.

A point on the liquid ring accordingly describes a trajectory analogous to that indicated at 25 on Fig. 6 which shows schematically a plan view of chamber 20 and of wheel 15. The angular velocity of rotation $\omega$ of each point is approximately given by the relation: $\omega = \frac{3}{8}\theta_0\theta_1\sqrt{g/r}$. The combination remains in equilibrium, the sum of the reactions during one complete turn of the shaft being zero.

When the system deviates from its position of vertical equilibrium, that is to say when the axis of the gyroscope is inclined to the gravitational vertical, one sees immediately that the symmetry is broken as a result of the weight of the ballast liquid. The ring 17 will have different reactions on different points of the cavity 20, according to the position of the wheel 15 which is no longer located at the center of gravity of the ring. The speed of the liquid will be accordingly different at different points in the ring 17, thus producing an accumulation of the liquid at a point and shifting the center of gravity of the liquid ring to the point G1 Fig. 7, when the vertical line passing through the center of gravity G of the combination intersects the spherical surface of the chamber 20 at V.

The weight of liquid whose center of gravity is at G1 will produce a couple which by the reaction of a gyroscopic combination, restores the combination by making it precess until the axis of the gyroscope coincides again with the vertical line through that point.

It is clear that the invention is not limited to the apparatus shown and described but is on the contrary susceptible to numerous modifications and adaptations without departing from the scope of the invention as indicated by the accompanying claims.

What is claimed is:

1. A gyroscopic system including a mass and a shaft, supporting said mass and arranged to rotate therewith, comprising a hollow body supporting said shaft at one end thereof, a liquid ballast contained in said hollow body, means for rotating said mass and said shaft, said hollow body and shaft being so arranged that the axis of generation of said hollow body passes through the center of gravity of the rotary system, and the other end of the shaft of the gyroscope being partially immersed in and rotating the liquid ballast in such a way that the trajectory of the center of gravity of the liquid ballast will follow a direction substantially opposite to the gyroscopic precession.

2. A gyroscopic system comprising a gyroscope, having a mass and a shaft supporting said mass and arranged to rotate therewith, a chamber, the shaft of the gyroscope extending through the wall of the chamber and having one end free and positioned in spaced relation to the chamber wall, said chamber forming a container for receiving a quantity of a liquid ballast sufficient to partially immerse the free end of the shaft of the gyroscope, means for rotating said mass and said shaft, said shaft when rotating with its free end partially immersed in the liquid ballast being effective to stabilize the gyroscopic system, and said chamber and shaft being so arranged that the axis of generation of said chamber passes through the center of gravity of the gyroscope.

3. A gyroscopic system comprising a gyroscope having a shaft, a hollow body, a liquid ballast contained in said hollow body, said hollow body and shaft being so arranged that the axis of generation of said hollow body passes through the center of gravity of said gyroscope, the shaft of the gyroscope extending into said hollow body, and a wheel secured to said shaft, means for rotating said mass and said shaft, said wheel being partially immersed in and rotating the liquid ballast in such a way that the trajectory of the center of gravity of the rotating liquid ballast will follow a direction substantially opposite to the gyroscopic precession.

4. A gyroscopic system comprising a gyroscope rotor having a shaft, a hollow body, a liquid ballast contained in said hollow body, said hollow body and shaft being so mounted relative to each other that the axis of generation of said hollow body passes through the center of gravity of the rotary system, so that said hollow body swings with said shaft, the shaft of the gyroscope rotor extending into said hollow body, said shaft terminating in a cap concentric with the wall of the hollow body, means for rotating said gyroscope rotor and said shaft, said cap being partially immersed in and rotating the liquid ballast in such a way that the trajectory of the center of gravity of the liquid ballast will follow a direction substantially opposite to the gyroscopic precession.

5. A gyroscopic system comprising a spherical casing, said casing having a partition wall for sub-dividing it into two distinct compartments, a gyroscope rotor having a shaft journalled for rotation in one of said compartments, liquid ballast in the other compartment, means for rotating said gyroscope rotor and said shaft, the shaft of the gyroscope rotor projecting through said partition wall and extending into and being partially immersed in said liquid ballast to rotate the same in such a way that the trajectory of the center of gravity of the liquid ballast will follow a direction substantially opposite to the gyroscopic precession.

6. A gyroscopic system comprising a casing, said casing having a partition wall for sub-dividing it into two distinct compartments, a gyroscope rotor having a shaft journalled for rotation in one of said compartments, liquid ballast in the other compartment, the shaft of the gyroscope rotor projecting through said partition wall and into the compartment containing the liquid ballast, means for rotating the gyroscope rotor and said shaft, a wheel secured to said shaft, said wheel extending into said liquid ballast to rotate the same in such a manner that the trajectory of the center of gravity of the liquid ballast will follow a direction substantially opposite to the gyroscopic precession.

7. A gyroscopic system comprising a casing, said casing having a partition wall for sub-dividing it into two distinct compartments, a gyroscope rotor having a shaft journalled for rotation in one of said compartments, liquid ballast in the other compartment, the shaft of the gyroscope rotor projecting through said partition wall and into the compartment containing the liquid ballast, a frusto-spherical wheel secured to said shaft, means for rotating said gyroscope rotor and said shaft, said wheel extending into and being partially immersed in said liquid ballast to rotate the same in such a manner that the trajectory of the center of gravity of the liquid ballast will follow a direction substantially opposite to the gyroscopic precession.

8. A gyroscopic system comprising a casing, said casing having a partition wall for sub-dividing it into two separate and distinct compartments, positioned one above the other, a gyroscope rotor having a shaft journalled for rotation in the upper compartment, liquid ballast in the lower compartment, the shaft of the gyroscope rotor projecting through said partition wall and into the lower compartment, said shaft terminating in a cap concentric with the wall of said lower compartment, means for rotating said gyroscope rotor and said shaft, said cap extending into and being partially immersed in said liquid ballast to rotate the same in such a manner that the trajectory of the center of gravity of the liquid ballast will follow a direction substantially opposite to the gyroscopic precession, and the upper part of said lower compartment being arranged in such a way as to substantially increase the reaction of the liquid ballast upon the wall of the lower compartment whenever the inclination of the stabilizing system passes a certain pre-determined limit.

GUY L. H. HERONDELLE.

REFERENCES CITED

The following references are of record in the file of this patent:

FOREIGN PATENTS

| Number  | Country | Date          |
|---------|---------|---------------|
| 636,828 | France  | Jan. 16, 1928 |